United States Patent [19]

Kaizu et al.

[11] Patent Number: 5,241,854
[45] Date of Patent: Sep. 7, 1993

[54] TESTING APPARATUS FOR BENCH TESTING VEHICULAR DRIVING PERFORMANCE

[75] Inventors: Hideo Kaizu, Gunma; Kimihiko Kaneko, Tokyo, both of Japan

[73] Assignee: Kabushiki Kaisha Meidensha, Tokyo, Japan

[21] Appl. No.: 812,167

[22] Filed: Dec. 23, 1991

Related U.S. Application Data

[63] Continuation of Ser. No. 468,643, Jan. 23, 1990, Pat. No. 5,136,879.

[30] Foreign Application Priority Data

| Jan. 24, 1989 | [JP] | Japan | 1-14822 |
| Jan. 24, 1989 | [JP] | Japan | 1-14823 |
| Jan. 24, 1989 | [JP] | Japan | 1-14824 |
| Jan. 24, 1989 | [JP] | Japan | 1-14825 |

[51] Int. Cl.⁵ .............................................. G01L 5/13
[52] U.S. Cl. ................................................... 73/117
[58] Field of Search .......................... 73/117, 123, 126

[56] References Cited

U.S. PATENT DOCUMENTS

| 3,363,455 | 1/1968 | Vanderbilt, Jr. | 73/117 A X |
| 3,520,180 | 7/1970 | Polhemus et al. | 73/146 X |
| 3,575,621 | 4/1971 | Voland | 310/112 |
| 3,763,699 | 10/1973 | Sangster | 73/117 |
| 3,926,043 | 12/1975 | Marshall et al. | 73/117 |
| 4,324,128 | 4/1982 | Langer | 73/8 |
| 4,458,527 | 7/1984 | McFarland et al. | 73/146 |
| 4,622,848 | 11/1986 | Doi | 73/146 |
| 4,627,311 | 12/1986 | Yokooku et al. | 74/866 |
| 4,680,959 | 7/1987 | Henry et al. | 73/117 |
| 4,758,967 | 7/1988 | Shmuter et al. | 364/550 |
| 4,821,190 | 4/1989 | Patil | 364/424.1 |
| 4,860,883 | 8/1989 | Knaul et al. | 198/495 |
| 4,870,585 | 9/1989 | Mansolini | 364/431.03 |
| 4,984,988 | 1/1991 | Mizushina et al. | 434/380 |
| 4,991,430 | 2/1991 | Kaizu | 73/117 |
| 4,998,436 | 3/1991 | Kaizu et al. | 73/117 |
| 5,060,176 | 10/1991 | Nawa et al. | 364/579 |
| 5,111,685 | 5/1992 | Langer | 73/117 |

*Primary Examiner*—Jerry W. Myracle
*Attorney, Agent, or Firm*—Bachman & LaPointe

[57] ABSTRACT

A bench testing apparatus for an automotive vehicle, comprises a rotary belt assembly including a pair of rotary drums arranged in parallel and spaced apart relationship to each other, a metallic endless belt extending over the drums and wrapped therearound, and a supporting structure disposed at a tread mounting section of the belt and oriented between the drums, the supporting structure including a rigid and stationary support base and a non-compressible fluid layer formed between the supporting base and the belt for acting as hydrodynamic bearing for the belt. A dummy load simulating vehicular traveling resistance, is associated with at least one of the drums. Also, a measuring apparatus is provided for measuring driving torque exerted on the belt via a vehicular driving wheel. The tread mounting section being oriented for receiving a vehicular wheel tread for forming a testing surface to receive the driving torque.

2 Claims, 3 Drawing Sheets

TESTING APPARATUS FOR BENCH TESTING VEHICULAR DRIVING PERFORMANCE

This is a continuation of application Ser. No. 07/468,643, filed Jan. 23, 1990, now U.S. Pat. No. 5,136,879.

BACKGROUND OF THE INVENTION

1. Field of the Invention

The present invention related generally to a bench testing apparatus for testing driving performance of an automotive vehicle. More specifically, the invention relates to a testing apparatus which can allow bench testing of vehicular performance in various conditions.

2. Description of the Background Art

In the automotive industries, bench testing apparatus has been used for testing driving performance, such as an engine performance. One of the typical constructions of bench testing apparatus has been disclosed in Japanese Utility Model First (unexamined) publication (Jikkai) Showa 53-28881. In the disclosed system, a pair of rotary drums are provided to be rotatingly driven by the engine driving torque transmitted thereto via vehicular driving wheels. The rotary drums are associated with a dummy load, such as a flywheel for modeling vehicular traveling resistance, and a dynamometer for measuring driving torque exerted on the rotary drums.

Such bench testing apparatus is effectively used in the automotive industries or service stations because it allows testing of the vehicular performance within a factory. The result obtained from the bench test by means of such conventional bench testing apparatus is not in precisely coincidence with that obtained from an actual road test. Further particularly, the test results becomes worse in terms of the precision in some kind of test to make such bench testing apparatus inapplicable.

SUMMARY OF THE INVENTION

Therefore, it is an object of the present invention to provide a bench testing apparatus which may solve the problems encountered in the conventional testing apparatus.

Another object of the invention is to provide a bench testing apparatus which is applicable for ordinarily vehicular performance test on various road conditions, such as up-hill, down-hill, undulated road and so forth.

According to one aspect of the invention, a bench testing apparatus for an automotive vehicle, comprises:

a rotary belt assembly including a pair of rotary drums arranged in parallel and spaced apart relationship to each other, a metallic endless belt extending over the drums and wrapped therearound, and a supporting structure disposed at a tread mounting section of the belt and oriented between the drums, the supporting structure including a rigid and stationary support base and a non-compressible fluid layer formed between the supporting base and the belt for acting as hydrodynamic bearing for the belt;

a dummy load simulating vehicular traveling resistance, associated with at least one of the drums;

means for measuring driving torque exerted on the belt via a vehicular driving wheel, the tread mounting section being oriented for receiving a vehicular wheel tread for forming a testing surface to receive the driving torque.

The tread mounting section may receive front and rear wheels of the automotive vehicle. Alternatively, the tread mounting section may receive left and rear wheels of the automotive vehicle. In the further alternative, the tread mounting section may receive all four wheels of four wheeled vehicle.

According to another aspect of the invention, a bench testing apparatus for an automotive vehicle, comprises:

a plurality of rotary belt assemblies, each including a pair of rotary drums arranged in parallel and spaced apart relationship to each other, a metallic endless belt extending over the drums and wrapped therearound, and a supporting structure disposed at a tread mounting section of the belt and oriented between the drums, the supporting structure including a rigid and stationary support base and a non-compressible fluid layer formed between the supporting base and the belt for acting as hydrodynamic bearing for the belt;

a dummy load simulating vehicular traveling resistance, associated with at least one of the drums of each of the rotary belt assemblies;

means for measuring driving torque exerted on the belt of each of the rotary belt assemblies via a vehicular driving wheel, the tread mounting section of each rotary belt assemblies being oriented for receiving a tread of each of vehicular wheels for forming a testing surface to receive the driving torque.

According to a further aspect of the invention, a method for bench testing of an automotive vehicle, comprises the steps of:

arranging a pair of rotary drums arranged in parallel and spaced apart relationship to each other;

providing a metallic endless belt over the drums and wrapped therearound defining a tread mounting section on which a tread of vehicular wheel is mounted at an orientation between the drums;

providing a supporting structure for the tread mounting section of the belt, which supporting structure including a rigid and stationary support base;

forming a hydrodynamic bearing layer of a non-compressible fluid layer between the supporting base and the belt for acting as hydrodynamic bearing for the belt;

applying a dummy load simulating vehicular traveling resistance, for at least one of the drums;

placing automotive vehicle on the bench testing apparatus with placing the tread of vehicular wheel on the tread mounting section;

driving the vehicle on the apparatus; and measuring driving torque exerted on the belt via a vehicular driving wheel.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
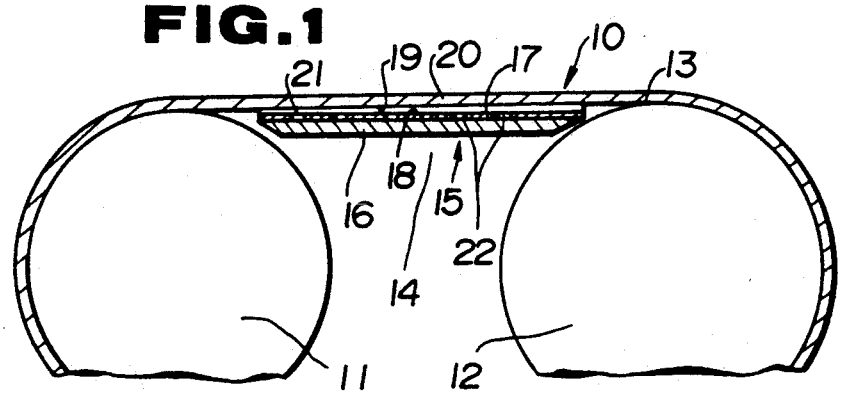
FIG. 1 is a section showing the preferred embodiment of a rotary belt assembly of a bench testing apparatus according to the present invention.

Referring now to the drawings, particularly to FIG. 1, the preferred embodiment of a bench testing apparatus includes a rotary belt assembly 10, The rotary belt assembly 10 comprises a pair of rotary drums 11 and 12 and an endless metallic belt 13. The pair of drums 11 and 12 are provided in parallel relationship with directing the rotation axis substantially perpendicular to the longitudinal axis of the vehicle, and in longitudinally spaced apart relationship with each other for maintaining a predetermined clearance 14 therebetween. The belt 13 extends over the pair of drums 11 and 12 and wrapped on the outer peripheries thereof.

The belt 13 is rotatably supported by means of a supporting structure 15. The supporting structure 15 comprises a rigid supporting base 16 disposed between the pair of drums 11 and 12. A slider plate 17 is mounted on the supporting base 16. The slider plate 17 has an upper surface 18 mating with the lower surface 19 of the upper section 20 of the belt. A lubricating fluid layer 21 is formed between the mating surfaces 17 and 18 of the supporting base 16 and the belt 13. The lubricating fluid layer 20 is formed of a non-compressible liquid state fluid, such as water. In order to form the lubricating fluid layer 20, a plurality of water supply ports 22 are formed through the slider plate 17. The water supply ports 22 are distributed over overall area of the slider plate 17 in order to achieve establishment of uniform fluid pressure in the lubricating fluid layer 21. Though it is not shown in the drawings, these water supply ports 22 are connected to a water supply line which is, in turn, connected to a water source so as to supply the pressurized water. A drainage (not shown) is formed along the periphery of the slider plate 17 and is also associated with the lubricating fluid layer 21 for collecting and draining part of water in the lubricating fluid layer.

Figure 6:
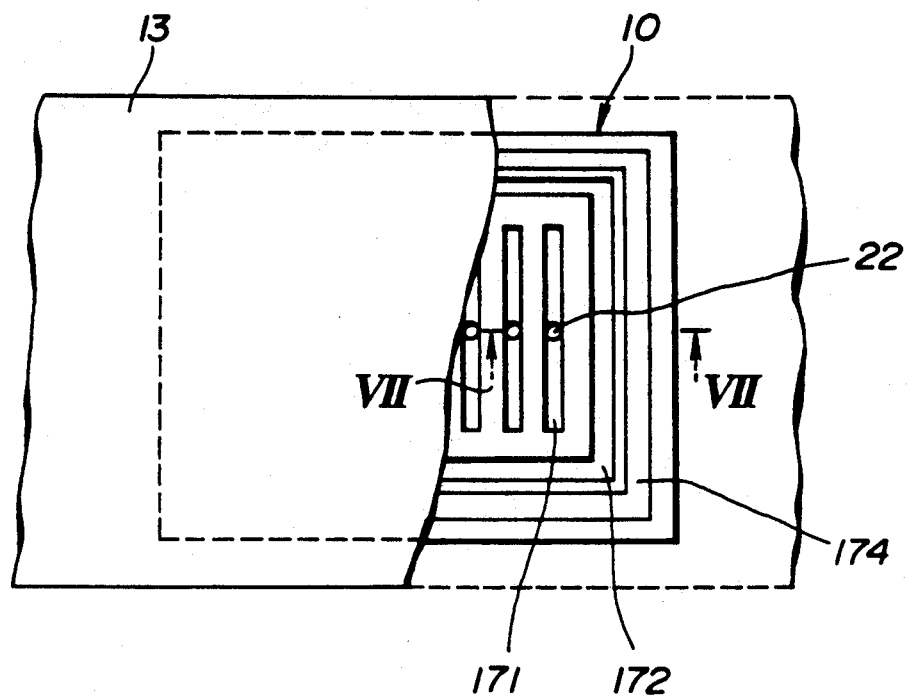
FIG. 6 is a partially cut-out plan view of the preferred embodiment of the rotary belt assembly of FIG. 1.
Figure 7:
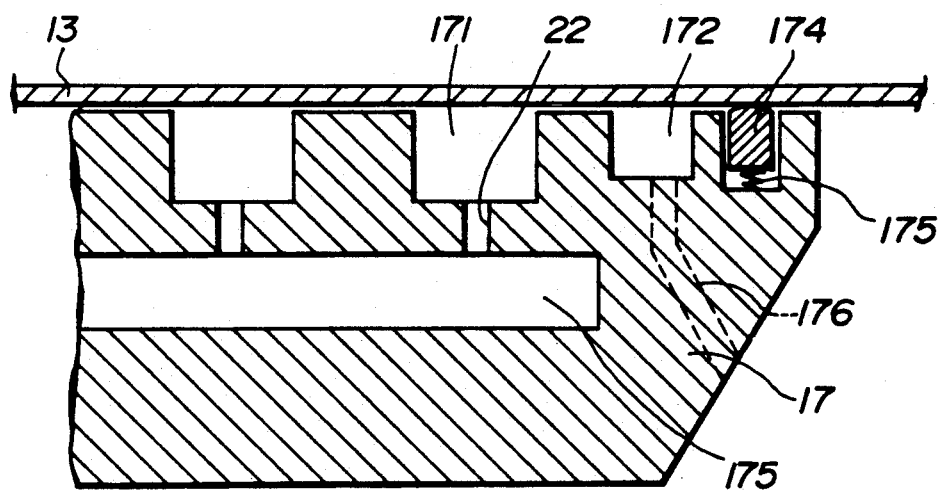
FIG. 7 is a section taken along line VII—VII of FIG. 6.

The water supply pressure, flow rate and so forth and the drain water flow rate may be adjusted so that the lubricating fluid layer is established with a predetermined pressure. One example of the water supply and drain structure to be employed in the preferred embodiment of the rotary belt assembly according to the present invention will be seen in FIGS. 6 and 7. In the shown construction, the slider plate 17 is formed with a plurality of transversely extending grooves 171 arranged in longitudinal alignment. On the other hand, a drainage groove 172 is formed along the peripheral edge of the slider plate 17. Along the outer peripheral edge of the drainage groove 173, a sealing member 174 for establishing liquid tight seat between the belt 13. As can be seen from FIG. 7, the sealing member 174 is made of a felt material. The sealing member 174 is biased toward the belt 13 by means of a bias spring.

A plurality of water supply ports 22 opens to the aforementioned transversely extending grooves 171 at the upper ends thereof. The lower ends of the water supply ports 22 are connected to a water supply path 175 extending through the slider plate 17 and connected to a pressurized water source. The drainage groove 172 is connected to a drain line 176 for draining the water entering into the drainage groove 172.

It should be noted that the water supply system and drain system applicable for the preferred embodiment of the rotary belt assembly 10 set forth above has also been disclosed in the U.S. Pat. No. 4,324,128, issued on Apr. 13, 1982, to William J. Langer. The disclosure of the above-identified U. S. Patent is herein incorporated by reference for the sake of disclosure.

A dummy load, such as a flywheel, is applied for at least one of the rotary drums 11 and 12 for simulating resistance against vehicle travel at actual travel of the vehicle. Also, a dynamometer is coupled with one of the rotary drum for measuring torque transmitted to the belt via the driving wheels of the vehicle.

The rotary belt assembly 10 constructed as set forth above can be used in various fashion as illustrated in FIGS. 2 through 5 for actually implementing bench test.

Figure 2:
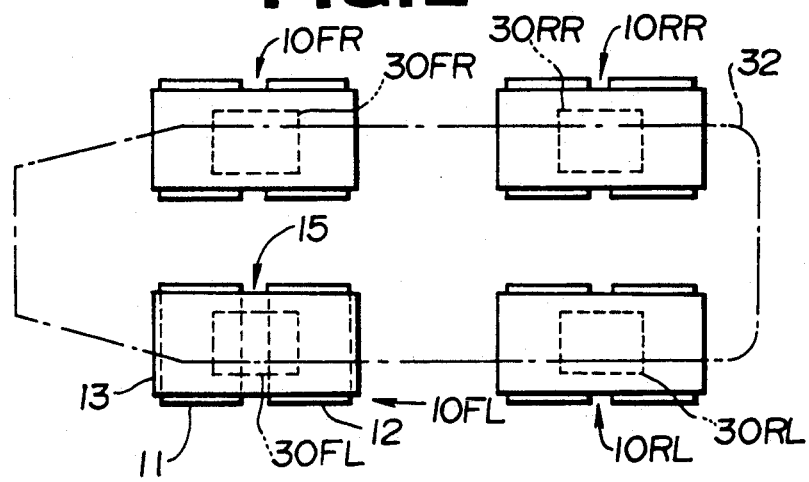
FIG. 2 is a plan view showing first embodiment of layout of the preferred construction of the rotary belt assembly of FIG. 1.

In the first arrangement, front-left, front-right, rear-left and rear-right rotary belt assemblies 10FL, 10FR, 10RL and 10RR are provided independently for respective of front-left, front-right, rear-left and rear-right wheels 30FL, 30FR, 30RL and 30RR, as shown in FIG. 2. The rotary belt assemblies 10 are so arranged that the wheels 30FL, 30FR, 30RL and 30RR of a vehicle 32 are placed respective positions where the supporting structure 15 is provided.

In such arrangement, respective of the rotary belt assemblies 10FL, 10FR, 10RL and 10RR are associated with mechanisms which perform adjustment of elevation of the associated rotary belt assemblies so that the elevation of belt surfaces on which the vehicular wheels are placed can be adjusted independently on each other. Therefore, with the shown construction, undulated road, up-hill, down-hill and so forth can be simulated in addition to the simulation of the flat road.

Figure 3:
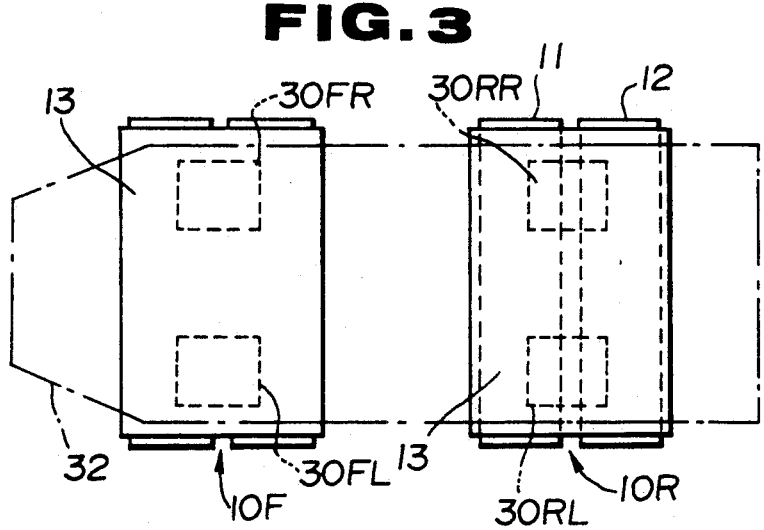
FIG. 3 is a plan view showing second embodiment of layout of the preferred construction of the rotary belt assembly of FIG. 1.

In the second arrangement, front and rear rotary belt assemblies 10F and 10R are provided in laterally parallel relationship to each other, as shown in FIG. 3. The front wheels 30FL and 30FR are placed on the front rotary belt assembly 10F. On the other hand, the rear wheels 30RL and 30RR are placed on the rear rotary belt assembly 10R. Each of the rotary belt assemblies 10F and 10R are associated with the height adjusting mechanism for adjusting the height level of the belt surface on which the vehicular wheel is mounted. Therefore, similarly to the foregoing first arrangement, not only flat road, but also up-hill and down-hill road can be simulated.

Figure 4:
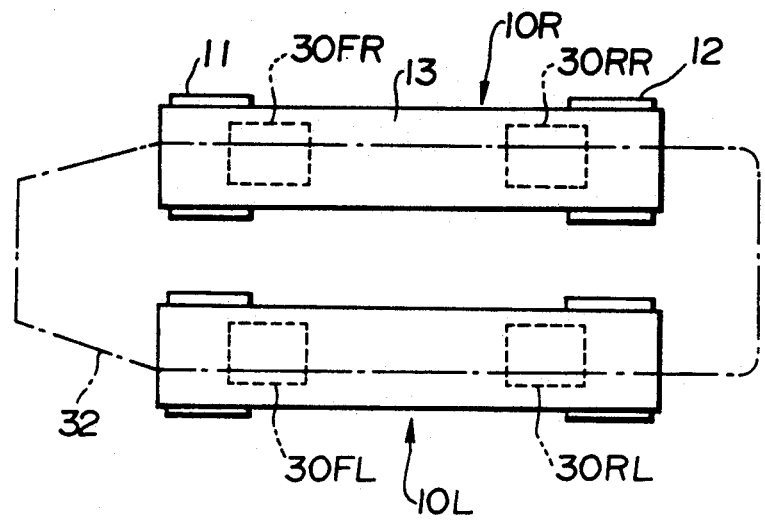
FIG. 4 is a plan view showing third embodiment of layout of the preferred construction of the rotary belt assembly of FIG. 1.
Figure 5:
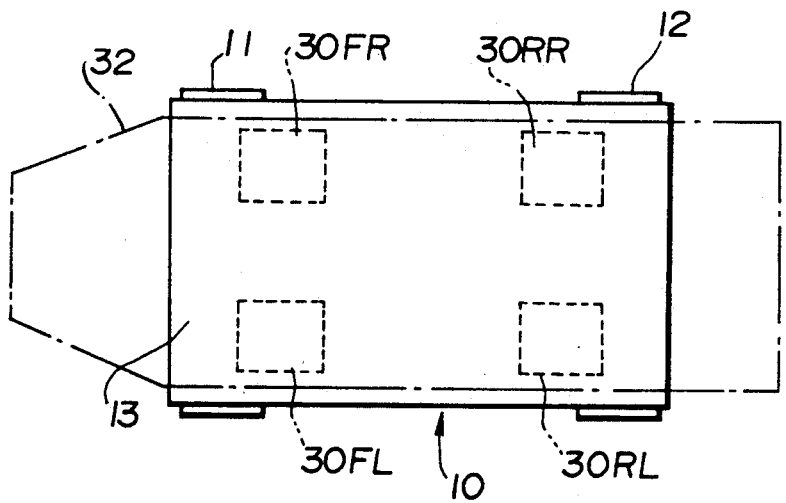
FIG. 5 is a plan view showing fourth embodiment of layout of the preferred construction of the rotary belt assembly of FIG. 1.

In the third arrangement, left and right rotary belt assemblies 10L and 10R are provided in longitudinally parallel relationship to each other, as shown in FIG. 4. The front-left and rear-left wheels 30FL and 30RL are placed on the left rotary belt assembly 10L and the front-right and rear-right wheels 30FR and 30RR are placed on the right rotary belt assembly 10R. In such case, by adjusting dummy load applied for respective of the left and right rotary belt assemblies, the belt drive speed by the left and right driving wheels can be differentiated to each other. By this curve road can be simulated for testing operation of the differential gear unit.

In the fourth arrangement, sole rotary belt assembly 10 is provided. In such case, the front-left, front-right, rear-left and rear-right wheels 30FL, 30FR, 30RL and 30RR are mounted on the sole belt assembly. Therefore, the bench test can be performed substantially equivalent condition to that in the actual road test.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A bench testing apparatus for an automotive vehicle, comprising:

first and second rotary belt assemblies each including a pair of rotary drums arranged in parallel and spaced apart relationship to each other, a metallic endless belt extending over said drums and wrapped therearound, and a supporting structure disposed at a tread mounting section of said belt and oriented between said drums, said supporting structure including a rigid and stationary support base and a non-compressive fluid layer formed between said supporting base and said belt for acting as hydrodynamic bearing for said belt, said first and second rotary belt assemblies being arranged in side-by-side relationship such that said tread mounting section of said first rotary belt assembly receives the left front and left rear wheels of said automotive vehicle and said tread mounting section of said second rotary belt assembly receives the right front and right rear wheels of said automotive vehicle;

a dummy load simulating vehicular traveling resistance, associated with at least one of said drums;

means for measuring driving torque exerted on said belt via a vehicular driving wheel;

said tread mounting section being oriented for receiving a vehicular wheel tread for forming a testing apparatus to receive said driving torque, wherein at least one of the pair of rotary drums at the first and second rotary belt assemblies being associated with at least one of mechanisms which perform adjustment of elevation of the associated rotary belt assemblies so that the elevation of belt surfaces on which the vehicular wheels are placed are adjusted independently of each other and of the dummy load simulating apparatus so that the dummy load is applied to respective of said left and right rotary belt assemblies, the belt drive speed by the left and right driving wheels being differentiated to each other.

2. A bench testing apparatus for an automotive vehicle, comprising:

first, second, third and fourth rotary belt assemblies, each assembly including a pair of rotary drums arranged in parallel to each other and spaced apart relationship to each other, a metallic endless belt extending over said drums and wrapped therearound, and a supporting structure disposed at a tread mounting section of said belt and oriented between said drums, said supporting structure including a rigid and stationary support base and a non-compressible fluid layer formed between said supporting base and said belt for acting as hydrodynamic bearing for said belt, said first, second, third and fourth rotary belt assemblies being arranged in side-by-side relationship and longitudinally aligned along the moving direction of said belts such that said tread mounting section of said first rotary belt assembly receives a front right tire wheel, that of said second rotary belt assembly receives a rear right tire wheel, that of said third rotary belt assembly receives a front left tire wheel, and that of said fourth rotary belt assembly receives a rear left tire wheel of the vehicle;

a dummy load simulating vehicular traveling resistance, associated with at least one of said drums;

means for measuring driving torque exerted on said belt via at least one of said drums; and said tread mounting section being oriented for receiving a vehicular wheel tread to form a testing surface receiving said driving torque, wherein at least one of the pair of rotary drums at the first, second, third and fourth rotary belt assemblies being associated with at least one of a) mechanisms which perform adjustment of elevation of the associated rotary belt assemblies so that the elevation of belt surfaces on which the vehicular wheels are placed are adjusted independently of each other and of b) the dummy load simulating apparatus so that the dummy load is applied to respective of said left and right rotary belt assemblies, the belt drive speed by the left and right driving wheels being differentiated to each other.

* * * * *